Patented Dec. 10, 1940

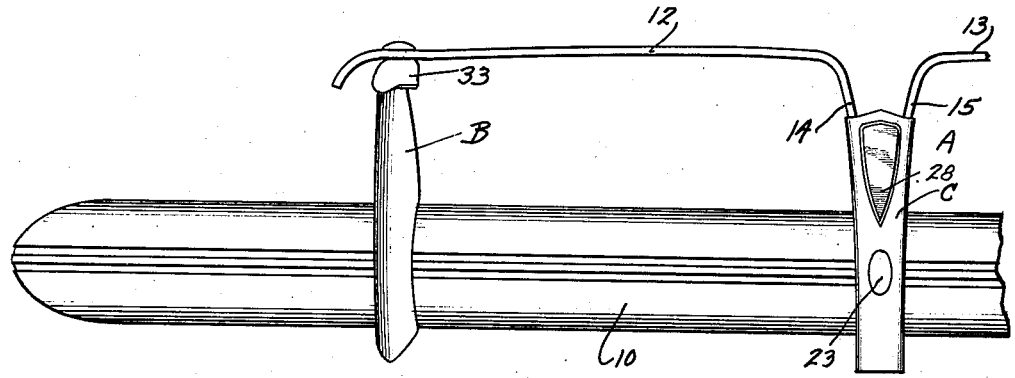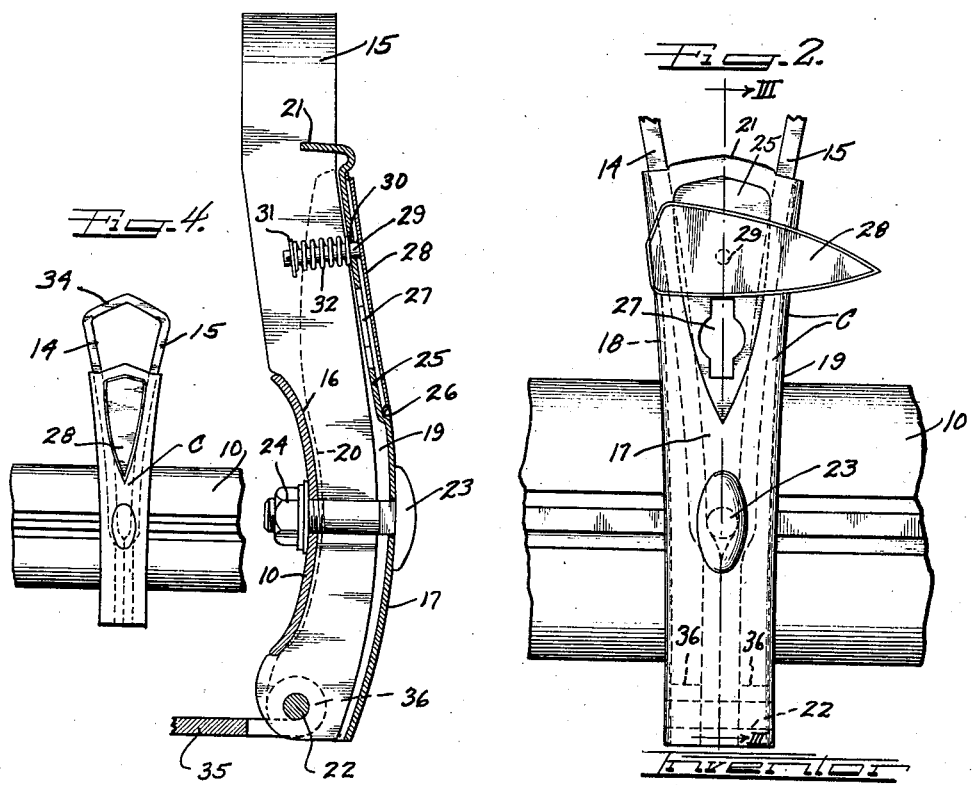

2,224,434

UNITED STATES PATENT OFFICE 2,224,434

BUMPER GUARD STRUCTURE AND ASSEMBLY

Herbert S. Jandus, Detroit, Mich., assignor to Houdaille-Hershey Corporation, Detroit, Mich., a corporation of Michigan Application August 7, 1939, Serial No. 288,794

2 Claims. (Cl. 293—55)

This invention relates to bumper guard structure for automobiles and the assembly thereof on the impact bar of a bumper structure particularly the front bumper of an automobile.

Where guard structure is mounted on the impact bar of a front bumper to extend a distance above the impact bar, some provision must be made which will enable a crank to be readily applied in case it is necessary to crank the engine. Various types of guard structures have been provided for the front bumper and usually provision is made to swing down the guard structure to clear the way for engine cranking. This involves more or less costly and complicated structure and therefore an important object of my invention is to provide guard structure in which the guard elements can be permanently affixed to the impact bar and need not be swung down or out of the way for engine cranking. In accordance with my invention the guard element at the middle of the bumper bar is apertured for the projection therethrough of the crank, with the aperture normally covered by a small medallion or name plate which is arranged to be readily moved to expose the aperture for the application of the crank, when cranking is necessary.

The various features of my invention are incorporated in the structure shown on the drawing, in which:

Figure 1 is a front elevation of the front half of a front bumper structure with my improved guard structure applied thereto;

Figure 2 is an enlarged front elevation of the middle guard element which is in front of the crank hole of the vehicle body for the crank;

Figure 3 is a section on plane III—III Figure 2; and

Figure 4 is a front elevation showing the construction of the middle guard when such guard is used separately.

Referring to Figure 1, a middle guard structure A is mounted on the impact bar 10 of the front bumper of an automobile, and between this middle guard and each end of the impact bar another guard structure B is applied, bars 12 and 13 extending between the middle guard structure and the outer guard structures to form guard rails for adding further protection.

The bars 12 and 13 are bent from flat bar stock and are arranged edgewise to the direction of travel of the vehicle so as to afford greater resistance strength to bumps or impacts. The inner end portions 14 and 15 of the bars 12 and 13 are deflected downwardly across the front of the impact bar and their front edges are recessed as indicated at 16 to fit the convex curvature of the front face of the impact bar. The bar portions 14 and 15 are separated a distance at their upper ends but they gradually converge and at their lower end are in contact, as shown in Figure 2.

A cover structure C which may be readily stamped from sheet metal, is of U-shaped cross-section, its front wall 17 extending across the front edges of the bars 14 and 15, and the sidewalls 18 and 19 extending along the outer sides of the bars 14 and 15, the rear edges of the side walls being shaped to correspond with the curvature of the impact bar 10, as indicated at 20. At their upper ends the side walls 18 and 19 engage against the outer faces of the bars 14 and 15 and the upper end of the front wall 17 is deflected rearwardly to form a top wall or flange 21 which extends between the bars 14 and 15 in engagement with the inner sides thereof, the bars at this point being therefore held properly spaced and against lateral displacement.

A pin 22 extends through the lower ends of the cover side walls 18 and 19 and through the lower ends of the bars 14 and 15 to secure the cover and guard together at this point. The front wall 17 of the cover is apertured to receive a bolt 23 for projection through an aperture in the impact bar 10 for reception of a nut 24, and when the bolt is tightened, the engagement of the cover structure at its upper and lower ends with the bars 14 and 15 will cause these bars and the entire guard structure to be rigidly clamped and secured to the impact bar. As shown on Figure 2, the bolt extends between the bars 14 and 15 just above the point where they come into contact with each other.

At its upper end, the front wall of the cover structure has the inwardly deflected or offset portion 25 forming a recess 26. In the deflected portion 25 is provided a passageway 27 which will be above the impact bar so that a crank may be inserted therethrough for cranking of the vehicle engine. Normally this cranking passageway is covered by a medallion or name plate 28 which seats in the recess 26. A pin 29 secured to and extending from the plate 28 projects through the opening 30 in the deflected wall portion 25 and at its inner end has a collar or washer 31 between which and the wall 25 is interposed a spring 32, this spring tending to hold the plate 28 within the recess but permitting the plate to be readily pulled outwardly and swung into position to clear the passageway 27, as shown on Figure 2. Thus, when it is desired to crank the engine, all that is necessary is to raise and swing the plate 28 for clearance of the crank passageway 27 and it will be unnecessary to anywise disturb the guard structure itself.

Where the guard structure bars 14 and 15 are extended to form the guard rails 12 and 13, as shown on Figure 1, the ends of the rails may be secured to the tops of the guard structures B by suitable clamping means 33, such as the clamping means disclosed in my copending application Serial No. 265,093, filed March 31, 1939.

Where the middle guard structure is desired to be used separately, and not in connection with other guard structures on the impact bar, the middle guard structure may be modified as shown on Figure 4. Instead of the bars 14 and 15 being separate bars, their upper ends could be connected by a yolk or cross bar 34 which could be integral with the bars. In other words, a single length of bar would be bent into inverted U-shape or hairpin shape and associated with cover structure 17 in the same manner as shown on Figures 2 and 3.

In order to further strengthen the guard structure against blows or impacts, a brace bar 35 may be provided and secured at its inner ends in any suitable manner to the vehicle chassis. As shown on Figures 3 and 4 the outer end of the bar could be bifurcated and the ends formed into eyes 36 for receiving the pin 22 and to be interposed between the side walls 18 and 19 of the cover structure C and the contacting lower ends of the bars 14 and 15. These eyes will then serve as spacers for holding the lower ends of the bars and the cover structure against lateral displacement.

I have shown a practical and efficient embodiment of my invention but I do not desire to be limited to the exact construction and arrangement shown and described as changes and modifications may be made without departing from the scope of the invention.

I claim as follows:

1. A bumper and guard structure comprising a bumper impact bar, a guard bar formed of a single length of comparatively heavy flat stock bar bent to inverted U or hairpin shape and extending transversely of said impact bar, the guard legs being in planes at right angles with the front of the bumper bar and being recessed at their front edges to fit against the front of the bumper bar, a cover structure of comparatively light sheet metal engaging against the front edge and along the outer sides of said guard bar along the lower portion thereof, the front wall of said cover structure and said impact bar having aligned openings, and a bolt extending through said openings and between the legs of said guard bar for clamping said legs between the cover structure and the impact bar and in position on the impact bar.

2. A bumper and guard structure comprising a bumper impact bar, a guard bar formed from a single length of comparatively heavy flat stock bar to inverted U or hairpin shape and extending transversely in front of the impact bar with its yoke end a distance above the impact bar, the legs of said guard bar being in planes at right angles to the plane of the guard bar and being recessed along their front edges to fit against the front of the impact bar, a cover structure of comparatively light sheet metal and comprising a front wall engaging against the front edges of said guard bar legs and having side flanges extending along the outer sides of said legs, a tongue at the upper end of said front wall projecting between the guard bar legs to hold them properly spaced, said front wall and said impact bar having aligned bolt holes, and a bolt extending through said holes and between the legs of said guard bar for rigidly clamping said guard bar to the impact bar.

HERBERT S. JANDUS.